US006626103B2

(12) United States Patent
Neumann

(10) Patent No.: US 6,626,103 B2
(45) Date of Patent: Sep. 30, 2003

(54) INVERTER

(75) Inventor: Norbert Hans-Georg Neumann, Westensee/Brux (DE)

(73) Assignee: NexPress Solutions LLC, Rochester, NY (US)

(*) Notice: Subject to any disclaimer, the term of this patent is extended or adjusted under 35 U.S.C. 154(b) by 0 days.

(21) Appl. No.: 09/850,387

(22) Filed: May 7, 2001

(65) Prior Publication Data

US 2002/0069774 A1 Jun. 13, 2002

(30) Foreign Application Priority Data

May 18, 2000 (DE) ........................................ 100 24 091
Dec. 1, 2000 (DE) ........................................ 100 59 913

(51) Int. Cl.[7] ................................................ B65G 47/24

(52) U.S. Cl. ....................... 101/230; 101/222; 101/223; 400/578; 271/185; 271/186; 198/405; 198/417

(58) Field of Search ................................ 271/185, 186, 271/902; 198/405, 417; 400/578, 188; 101/222, 223, 230

(56) References Cited

U.S. PATENT DOCUMENTS

| | | | | | |
|---|---|---|---|---|---|
| 1,688,459 | A | | 10/1928 | Forward | |
| 2,120,385 | A | * | 6/1938 | Albetoli | |
| 2,947,406 | A | * | 8/1960 | Hazelton, Jr. | |
| 3,838,771 | A | * | 10/1974 | Whiteford | 198/405 |
| 4,226,324 | A | * | 10/1980 | Stocker | 198/405 |
| 4,377,932 | A | * | 3/1983 | Dammann et al. | 57/336 |
| 4,690,268 | A | | 9/1987 | Ueshin | 198/399 |
| 4,705,157 | A | * | 11/1987 | Bowles | 198/405 |
| 4,850,582 | A | * | 7/1989 | Newsome | 271/185 |
| 5,411,250 | A | * | 5/1995 | Belec et al. | 198/405 |
| 5,535,997 | A | * | 7/1996 | Croyle et al. | 198/405 |
| 5,988,352 | A | * | 11/1999 | Ballestrazzi et al. | 198/405 |
| 6,371,303 | B1 | * | 4/2002 | Klein et al. | 209/534 |
| 6,409,008 | B1 | * | 6/2002 | Newsome | 198/403 |

FOREIGN PATENT DOCUMENTS

| | | | |
|---|---|---|---|
| DE | 1 181 721 | 11/1964 | |
| DE | 29 07 110 | 10/1979 | |
| DE | 34 44 848 A1 | 6/1986 | |
| DE | 296 18 932 U1 | 12/1996 | |
| EP | 0 160 739 | 11/1985 | B65H/5/02 |
| GB | 2 020 250 A | 11/1979 | |

* cited by examiner

*Primary Examiner*—Andrew H. Hirshfeld
*Assistant Examiner*—Dave A. Ghatt
(74) *Attorney, Agent, or Firm*—Lawrence P. Kessler

(57) ABSTRACT

An inverter (1) for thin, flat products (2), especially printing substrates in a printing machine, with belts (7, 8) positioned over two deflection pulleys (3, 4, 5, 6) that are set together at 180° between the deflection pulleys (3, 4, 5, 6). Such inverter is configured so that the product (2) and the belts (7, 8) move precisely in their reference positions. This is achieved by the fact that, in the transport direction (9), after a setting region (10) at least three guide rolls (11, 12, 13) are mounted on the supporting strand sides (7', 8') of belts (7, 8) in alternating arrangement and at least one of the guide rolls (11, 12 13) has a retaining collar (14) on at least one side and at least one guide roll (18) is arranged before the setting region (10). Further, at least one guide device (19, 20, 21) is arranged to guide product (2) to facilitate inversion.

12 Claims, 3 Drawing Sheets

INVERTER

CROSS-REFERENCE TO RELATED APPLICATION

This application is related to the following application filed on May 7, 2001:

U.S. patent application Ser. No. 09/850,388, filed in the name of Norbert Neumann, and entitled, DEVICE FOR INVERSION OF SHEETS IN A PRINTING MACHINE.

FIELD OF THE INVENTION

The invention relates to an inverter for a thin flat product, especially for printing substrates in a printing machine with belts positioned over two deflection pulleys that are set at 180° between the deflection pulleys.

Inverters are known in particular for handling of printing substrates, for example, in printing machines. The printing substrates are inverted for two-sided printing with such an inverter. However, other applications are also conceivable, for example, in further processing of printed substrates after printing.

An inverter is known from DE 29 07 110 C2. This is an inverter of a folding machine. The problem in such inverters relates to exact transport of the product, in which this is supposed to be positioned as precisely as possible after inversion. This is a requirement essential for printing quality, especially for inverters in printing machines that are set up for verso printing. It is supposed to be avoided that the product loses its alignment. The product must therefore be securely held between the belts and it must be guaranteed that the belts are not moved from their reference position by transverse forces, especially as a result of product transport.

An inverter for x-ray film sheets is known from DE 24 44 697 A1, which is equipped with transport rolls. These ensure that the x-ray film sheets are acted upon with a sufficient holding force by the alternate application of transport rolls. However, the x-ray film sheets lie fully between the transport belts and these are connected to each other in the variant with inversion on one side, since the two transport belts form by center folding of a material web. In this manner transverse forces cannot act on the transport belts so that they can be moved out of their reference position by the transverse forces, especially their mutual relative position. However, the transport belts in a typical inverter cannot be connected together in the manner just mentioned, since the product being transported is taken up at the site of the merging of the moving belts and leaves the inverter again at the site of separation of the belts.

SUMMARY OF INVENTION

The underlying task of the invention is therefore to configure an inverter so that the product and the belts move precisely in their reference positions.

The task is solved according to the invention in that at least three guide rolls are mounted on the supporting strand side of the belts in alternate arrangement viewed in the transport direction after the setting region and at least one of the guide rolls has a retaining collar on at least one side.

Because of the expedients according to the invention, the product is securely held between the strand side of the belts serving for product transport, in which the at least one retaining collar is mounted on one or more guide rolls, in order to stabilize running and the holding force of the belts also between the deflection pulleys. It is then expedient to mount the retaining collar on the side of the rolls on which transverse forces must be reckoned with, which can laterally deflect one or both belts. In particular, when an inverter must invert heavier flat products with a wide projection above the belts with high speed, at least one such retaining collar is essential. These requirements exist in particular in the inverters of printing machines.

Modifications of the invention serve to optimize the precision of inversion of the product, applying holding forces where these are essential for secure holding of the product and eliminating transverse forces where these occur.

One embodiment of the invention proposes that a retaining collar be situated on the side on which the outer edge of the product moves upward after the setting region. The second upper guide roll after the setting region then expediently has a retaining collar, since the largest transverse force from the oblique position of the product occurs there. Generally it is sufficient if two upper and one lower guide rolls are arranged after the setting region.

In order for the product to be held between the belts with sufficient forces, it is proposed that the guide rolls lie against the belts so that these are deflected from the linear direction.

In addition to the guide rolls following the setting region, it can also be proposed that at least one guide roll be arranged in or before the setting region. In this case a guide roll is expediently arranged beneath the supporting strand side of the belts in order to guarantee clean running of the belts and a certain pressure force for the products. Sagging of the belts as a result of the weight of the product can also be avoided in this manner.

If a product that protrudes over the belts to a greater extent than is normally the case in printed substrates is to be inverted, it is additionally expedient if at least one guide device that guides the product is arranged on at least one outer side. A guide device can thus be arranged to guide the outer edge that moves downward after the setting region. This is particularly expedient in harder, stiffer papers or similar products so that these reliably reach the plane for further transport at the end of the inverter. A guide device can also be provided so that it lifts the outer edge to the inversion zenith. This is particularly expedient in flexible papers so that these can be reliably brought to the outer side at the correct time despite their tendency toward sagging. The last two named guide devices are expediently continuous guide rails, for example, in the form of a stable wire that is bent and arranged according to the motion trend of the product.

For the edge of the product that moves downward in order to then be raised back to the horizontal plane after inversion, it is expedient if a guide device is provided that lifts the upward moving edge toward the end of inversion toward the horizontal plane. In addition, another guide device should be arranged that supports the downward moving edge in the horizontal end toward the end of inversion. This is the edge that passes through the zenith and which is not supposed to move beneath the horizontal plane so that the product can be reliably further transported.

The guide devices can be configured in a variety of ways. For example, both of the last named devices can be correspondingly configured sliding surfaces. However, other embodiments are naturally also conceivable.

A wide variety of belts can be used as belts. Flat belts, are more widely configured flat belts can be involved, or it is possible to provide several parallel running belts. A preferred variant, however, proposes that the belts be designed as V belts, since these exhibit high stability. It is expedient at least for V belts if the deflection pulleys are equipped with retaining collars on both sides at least where they serve as drive pulleys. High force transfer is possible on this account. Both the deflection pulleys and additional rolls can be configured so that the retaining collars are designed freely rotatable relative to the rolls. In this manner the belts can be guided without increased friction occurring in the region of the retaining collars between them and the belts. Wear is kept low because of this.

Since the belts are deformed by setting and V belts in particular exhibit different angular positions of their flanks in different deformation regions because of this deformation, it is expedient if the angles of the holding surfaces of the retaining collars are adjusted to the angular position of the flanks of the belt at the location of the corresponding roll. For example, it could be established that the angle of the flanks of the V belt in the region of the retaining collar of the deflection pulley was 25° and the flanks have an angle of 34° by setting of the V belts in different regions of the inverter. If this fact is considered in configuring the retaining surfaces of the retaining collars, clean support of the belts on these retaining surfaces occurs and thus clean, precise and wear-free running of the belts.

In addition to the aforementioned rolls, one or more additional path-holding rolls can be arranged for the belts. In order to guide the belts properly, it is then expedient if one or more path-holding rolls have retaining collars on both sides. It can be prescribed that at least one path-holding roll be arranged on the strand side of the belt that guides the product or if one or more path-holding rolls are arranged on the return side of the belt. In the latter case, the at least one path-holding roll can be arranged so that it prevents a collision of the product with the return side of the belt.

BRIEF DESCRIPTION OF THE DRAWINGS

The invention is explained below with reference to the drawings. In the drawings.

DETAILED DESCRIPTION OF THE INVENTION

Figure 1:
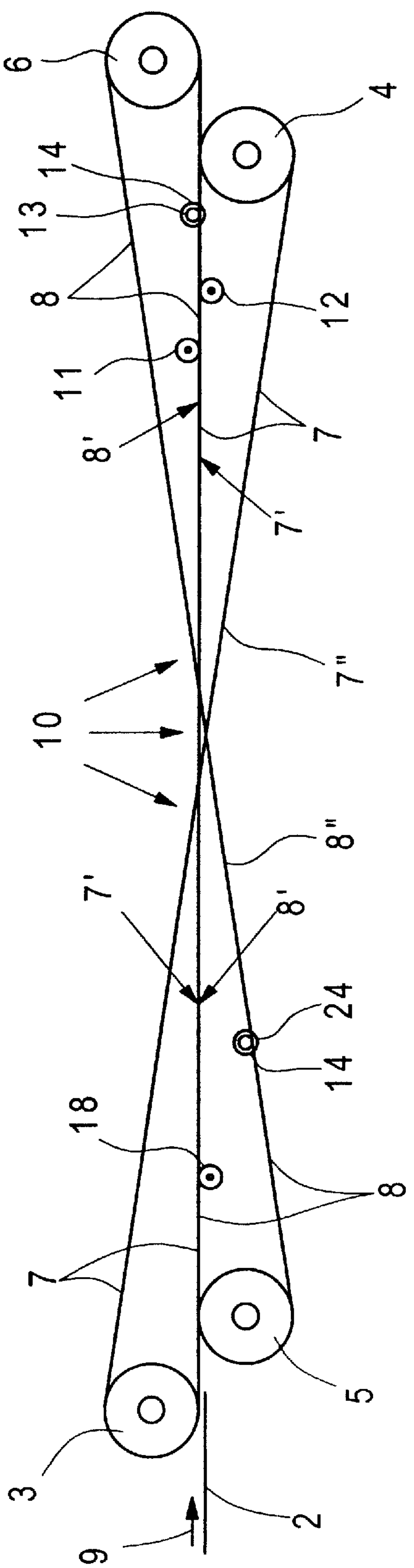
FIG. 1 shows a practical example of the invention in a side view.

FIG. 1 shows a practical example of the inverter 1 according to the invention in a side view. The thin, flat product 2, for example, like printing substrate, is fed to inverter 1 in the direction of arrow 9. Transport and inversion occur by two belts 7, 8, which are arranged relative to each other so that two strand sides 7' and 8' run in the direction of arrow 9 and transport the thin, flat product 2. The belts 7 and 8 are set so that the strand side 7' is situated on the top and the strand side 7' on the bottom after the setting region 10. Because of this setting of the belts 7 and 8, the product 2 held between strand side 7' and 8' is inverted by 180° so that, after inversion, the two outer edges 16, 16' (see FIG. 4) are exchanged and the previous bottom is situated on the top.

The belts 7 and 8 are carried by deflection pulleys 3, 4, 5 and 6. Belt 7 is carried by an upper deflection pulley 3 and a lower deflection pulley 4. The strand side 7' that guides product 2 runs between the bottom of deflection pulley 3 and the top of deflection pulley 4, and the return side 7" runs from the bottom of deflection pulley to the top of deflection pulley 3. The strand side 8' of the belt 8 that guides product 2 accordingly runs from the lower deflection pulley 5 on the top to the upper deflection pulley 6 on the bottom and the return side 8" of belt 8 runs from the top of deflection pulley 6 to the bottom of deflection pulley 5. Expedients so that the return side 7" and 8" do not rub against each other or the entering strand side 7' and 8' are naturally necessary. For example, a slightly oblique position of the deflection pulleys 3, 4, 5 and 6 can be used for this purpose. Path-holding rolls 24 can also be used for this purpose, which expediently have two retaining collars 14 and deflect one return side 8" forward and the other return side 7" rearward. As an example, only one path-holding roll 24 was shown, but naturally one or more path-holding rolls 24 can be provided on all belt sides 7', 7", 8', 8".

Since there is a problem in such inversion that the products 2 must be reliably held and must be aligned parallel to the direction of transport 9 during inversion, it is proposed that at least three guide rolls 11, 12 and 13 be arranged after the setting region 10. The guide rolls 11, 12, 13 are then arranged alternating on strand sides 7' and 8' so that they deflect belts 7 and 8 to a limited degree from the linear direction so that the pressure force of these strand sides 7' and 8' on products 2 is increased.

Since the inverted product 2 acts with transverse forces on belts 7 and 8, it is proposed to equip at least one of the guide rolls 11, 12, 13 with at least one retaining collar 14. The guide rolls 11, 12, 13 are preferably arranged so that two guide rolls 11 and 13 are situated in the upper region and a lower guide roll 12 is arranged in between. The second upper guide roll 13 is equipped with a retaining collar 14 in the rear region, i.e., on side 15 (see FIG. 4) on which the outer edge 16 of a product 2 moves upward after the setting region 10. In this manner, it is guaranteed that the absolute positioning and mutual relative positions of strand sides 7' and 8' are retained and so is positioning of the thin, flat product 2.

Figure 2:
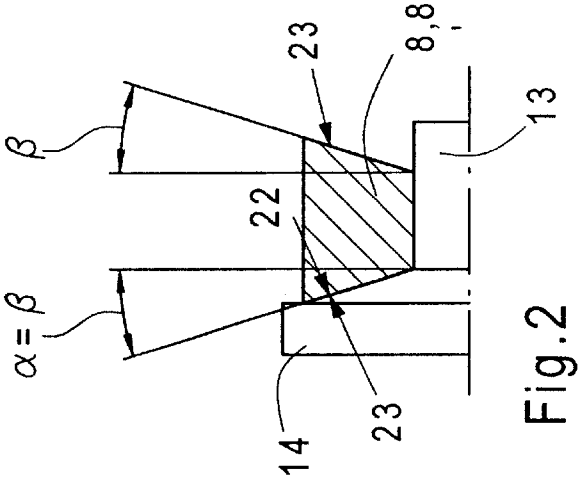
FIG. 2 shows a detail of FIG. 1.

FIG. 2 shows a detail of FIG. 1, specially the guide rolls 13 with the retaining collar 14. It must be kept in mind that angle $\alpha$ of the retaining surface 22 of retaining collar must agree with the angular position $\beta$ of the flanks 23 of belts 7, 8 that they have on the guide roll 13. However, because of setting, the angular position $\beta$ of the flanks 23 of belts 7, 8 is different. The angle $\alpha$ of the retaining surfaces 22 of guide roll 13 or another roll 3, 4, 5, 6, 11, 12, 13, 18, 24 is equipped with a retaining collar 14 must therefore also be different and correspond to the corresponding angle $\beta$ of the flanks 23 of belts 7, 8, depending on the site of the belt 7 or 8 at which such a guide roll 11, 12, 13, 18 or also a deflecting pulley 3, 4, 5, 6 or path-holding roll 24 is arranged.

Figure 3:
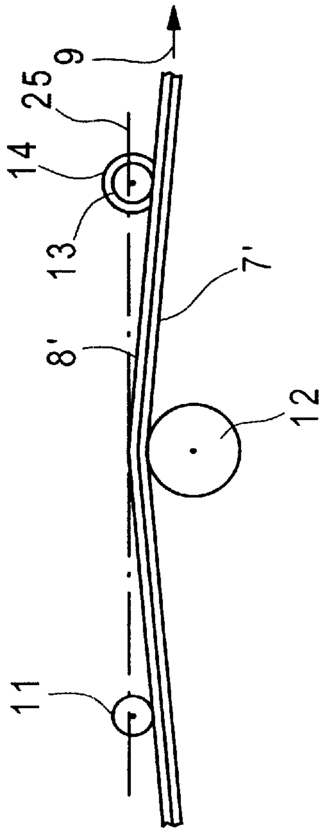
FIG. 3 shows another detail of FIG. 1.

FIG. 3 shows another detail of FIG. 1, namely the arrangement of the guide rolls 11, 12 and 13. This arrangement is such that the strand sides 7', 8' of belt 7, 8 guiding the product 2 are deflected from the linear direction 25. The linear direction is symbolized with the dash-dot line 25. The strand sides 7', 8' lie directly next to each other in the depiction. When a product 2 is transported, this is situated between strand sides 7' and 8'. Such guide rolls 11, 12 and 13 are particularly expedient to guarantee sufficient holding force when several flat products 2 are transported in close succession, as is the case in the inverter 1 of printing machines 26 (see FIG. 5).

Figure 4:
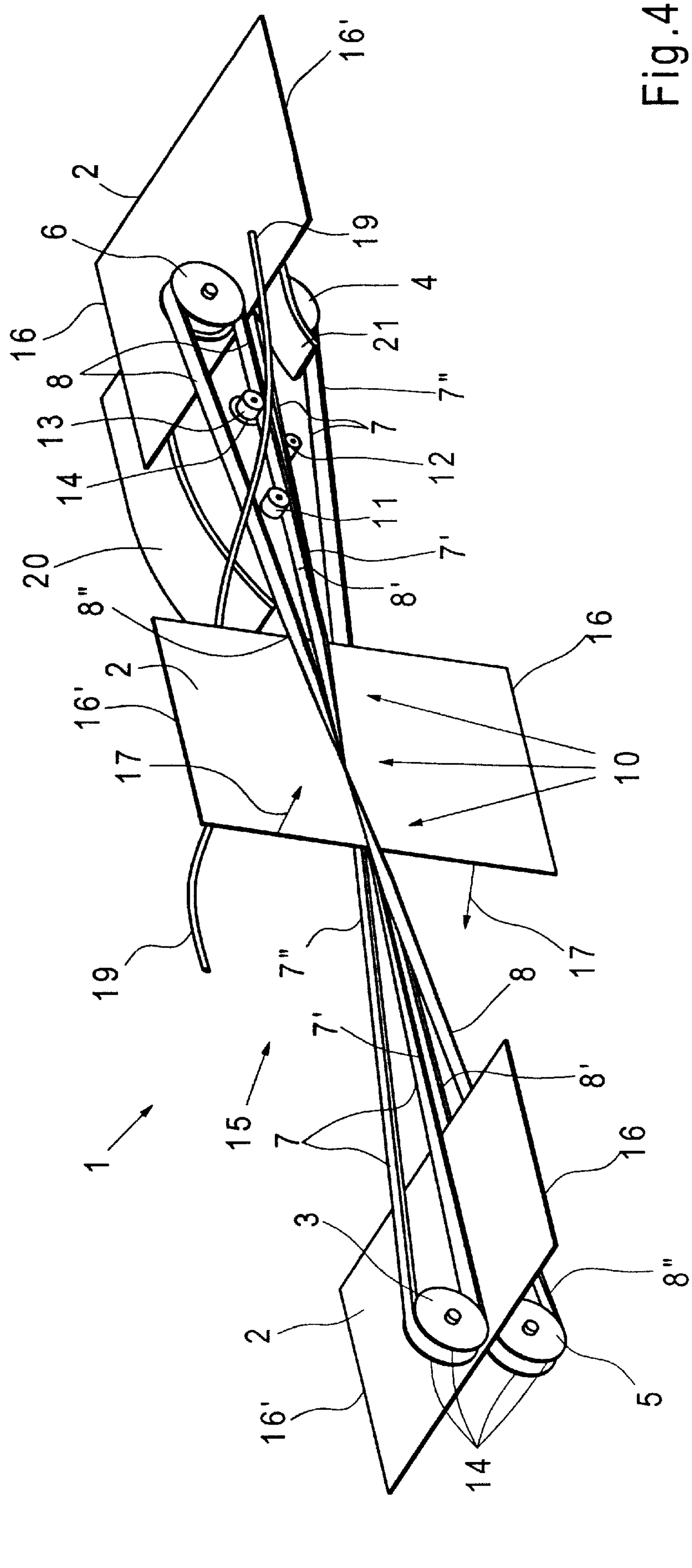
FIG. 4 shows another practical example of the invention in a perspective view.

FIG. 4 shows another practical example of the inverter according to the invention 1 in a perspective view. The above description is referred to concerning the identical reference numbers. Because of the perspective depiction, it is apparent how inversion of a product 2 occurs in the direction of arrows 17. The rear outer edge 16' is moved upward at the beginning of the inverter 1, i.e., toward zenith, and the front outer edge 16 is on the bottom in the setting region 10. The upper outer edge 16' then moves forward and down and the lower outer edge 16 moves rearward and up so that at the end of the inverter 1, the previously rear outer edge 16' lies in the front and the formerly front outer edge 16 lies to the rear.

Guide devices 19, 20 and 21 serve to support this inversion. Guide device 19 serves to guide the edge 16' of product 2, in which this guide device 19 begins on the side 15 at which the outer edge 16' of product 2 moves upward and then extends forward and in the direction of the end of the inverter 1 so that the outer edge 16' is guided to the end position of product 2 when this leaves the inverter 1. Only the trend of guide device 19 is shown and its attachment was omitted for simplification. It is essential that the guide device 19 extend rearward on side 15 far enough and be attached so that the attachment does not hamper inversion of the product 2.

Another guide device serves to guide the outer edge 16 that is moved upward after the setting region 10 until the product 2 has reached the end position. The edge 16 or the region of product 2 connected to edge 16 then slides on the guide device 20 until it reached the horizontal plane upward.

The third guide device 21 serves to support the edge 16' toward the end of inversion so that it cannot sag downward. This guide device 21 extends far enough outward that it reaches edge 16'. As the shaded area shows, it was cut off in order not to fully cover the lower deflection pulley 4.

The practical example of FIG. 4 shows that the deflection pulleys 3, 4, 5 and 6 are also equipped with two retaining collars 14 each in order to guarantee reliable guiding of the belt 7 and 8 designed as V belts.

Figure 5:
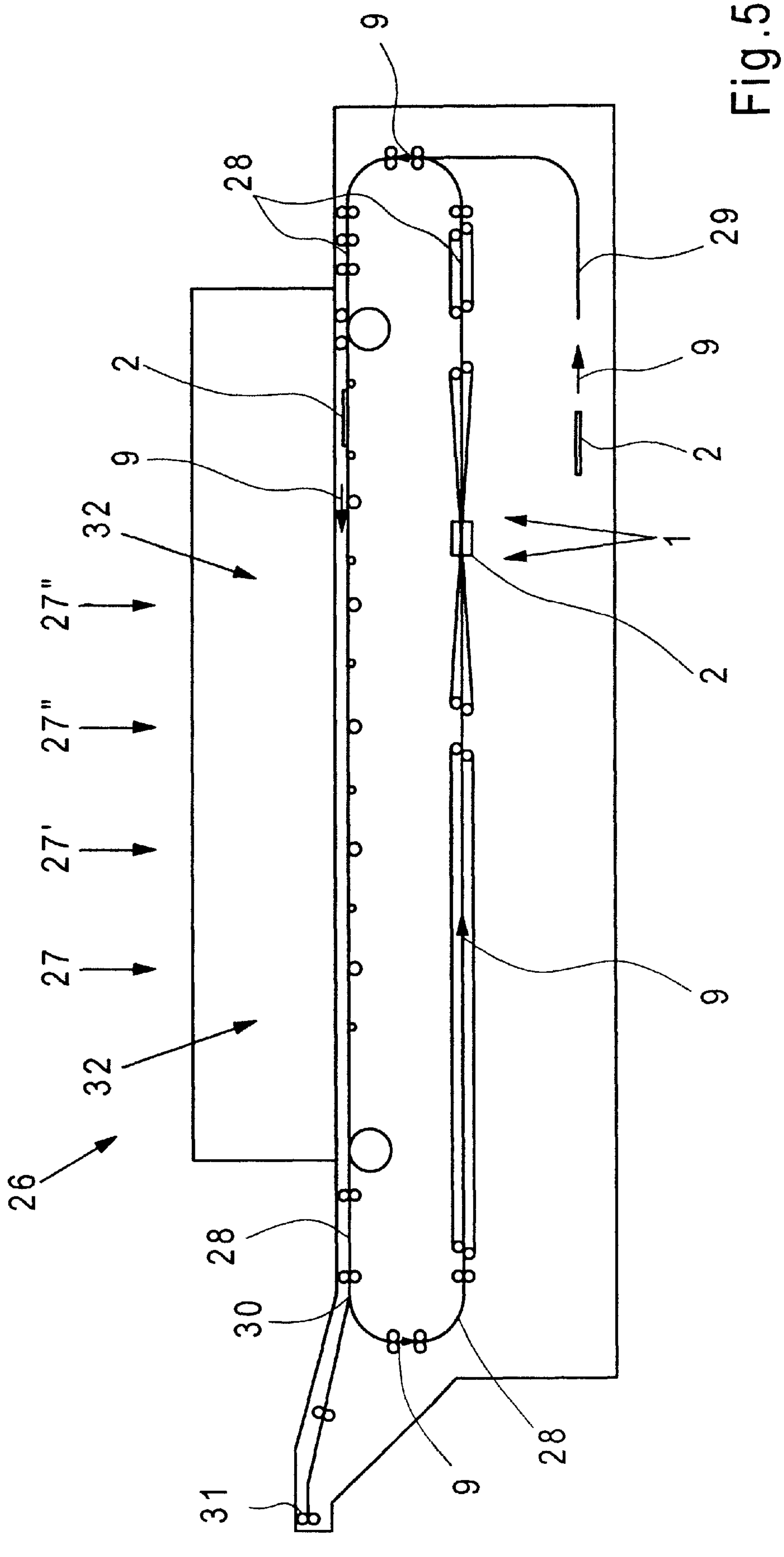
FIG. 5 schematically shows a printing machine with an inverter according to the invention.

FIG. 5 shows the printing machine 26 for the inverter 1. This type of printing machine 26 has an image transfer region 32 in which partial color images are transferred to the printing substrate by several printing groups 27, 27', 27", 27'". The printing substrates 2 come, for example, from a feed 29 from a supply container for the printing substrates 2 (not shown). The printing substrates 2 are then guided by a paper path 28. After the image transfer region 32, a shunt 30 is situated in the paper path 28 in order to feed the printing substrates 2 to a delivery 31 or to feed them back to the image transfer region 32 for verso printing. For this purpose, a paper path 28 leads back from shunt 30 to the image transfer region 32. An inverter 1 is arranged on this return paper path 28, which ensures that the printing substrates are inverted so that the back side of the printing substrates 2 is now facing the printing groups 27, 27', 27", 27'" and can be printed.

The practical examples are naturally only a selection of possible implementations of the invention. It can also be proposed that the product 2 be guided by means of flat belts 7, 8 or it is possible to arrange two or more parallel running belts 7, 8 that take the place of the individually arranged belts 7 and 8 and then together guide, hold and invert products 2. The guide devices 19, 20 and 21 can also be configured in a variety of ways. They can involve wires, rails or also surfaces. Different combinations of individual features of the described and depicted variants are also possible.

The invention has been described in detail with particular reference to certain preferred embodiment thereof, but it will be understood that variations and modifications can be effected within the spirit and scope of the invention.

LIST OF REFERENCE NUMBERS

1 Inverter
2 Thin, flat product (printing substrate)
3 Upper deflection pulley of belt 7
4 Lower deflection pulley of belt 7
5 Upper deflection pulley of belt 8
6 Lower deflection pulley of belt 8
7 Belt that carries the product before inversion on top
7' Strand side of belt 7 running in the transport direction
7" Return strand of belt 7
8 Belt that carries the belt before inversion on the bottom
8' Strand side of the belt 8 running in the transport direction
8" Return side of the belt 8
9 Arrow: transport direction
10 Setting region
11 First upper guide roll after the setting region
12 Lower guide roll after the setting region
13 Second upper guide roll after the setting region
14 Retaining collar
15 Side on which the outer edge of the product moves upward after the setting region
16, 16' Outer edges of the product
16 Outer edge that moves upward after the inversion region
16' Outer edge that intersects zenith and moves downward after the setting region
17 Arrows: direction of inversion
18 Guide roll before the setting region
19 Guide device that guides edge 16' of the product
20 Guide device that guides edge 16 of the product
21 Guide device that supports edge 16' toward the end of inversion
22 Retaining surfaces of retaining collar 14
23 Flanks of the belts
24 Path-holding roll
25 Linear direction
26 Printing machine
27, 27', 27", 27'" Printing groups
28 Paper path
29 Feed of a supply container
30 Shunt
31 Delivery
32 Image transfer region
$\alpha$ Angle of the retaining surfaces 22
$\beta$ Angular position of the flanks of the belts at the location of the corresponding roll 3, 4, 5, 6, 11, 12, 13, 18 or 24

What is claimed is:

1. Inverter (1) for thin, flat printing substrates (2) in a printing machine, with belts (7, 8) respectively positioned over two deflection pulleys (3, 4, 5, 6) that are together set at 180° between the deflection pulleys (3, 4, 5, 6), characterized that, in a transport direction (9), after a setting region (10), at least three guide rolls (11, 12, 13) are mounted on the respective supporting strand side (7', 8') of belts (7, 8) in alternating arrangement and said deflection pulleys (3, 4, 5, 6) are equipped with retaining collars (14) on both sides at least where they serve as guide rolls, said retaining collars (14) being freely rotatable relative to said deflection pulleys and guide rolls (3, 4, 5, 6, 11, 12, 13, 18, 24); at least one additional guide roll (18) arranged before the setting region (10); and at least one guide device (19, 20, 21) arranged that guides the printing substrates (2) on at least one outer side (16, 16') to facilitate inversion.

2. Inverter according to claim 1, characterized by the fact that a retaining collar (14) is situated on the side (15) on which the outer edge (16) of product (2) moves upward after the setting region (10).

3. Inverter according to claim 2, characterized by the fact that the second upper guide roll (13) after the setting region (10) has a retaining collar (14).

4. Inverter according to claim 1, wherein after the setting region (10) two upper (11, 13) and one lower guide roll (12) are arranged.

5. Inverter according to claim 4, wherein guide rolls (11, 12, 13) lie against the belts (7, 8) so that they are deflected from the linear direction (25).

6. Inverter according to claim 1, further including a guide device (19) is arranged to guide the outer edge (16') that moves downward after the setting region (10).

7. Inverter according to claim 1, further including a guide device (19) is such that it lifts the outer edge (16') to zenith.

8. Inverter according to claim 1, further including a guide device (20) which lifts the upward moving edge (16) on the horizontal plane toward the end of inversion.

9. Inverter according to claim 1, further including a guide device (20) that supports the downward moving edge (16') in the horizontal plane toward the end of inversion.

10. Inverter according to claim 1, wherein said belts (7, 8) are V belts.

11. Inverter according to claim 1, wherein the angle (α) of the retaining surfaces (22) of retaining collars (14) is adjusted to the angular position (β) for flanks (23) of belts (17, 18) at the location of the corresponding roll (3, 4, 5, 6, 11, 12, 13, 18 or 24).

12. Inverter according to claim 1, further including at least one path-holding roll (24), said at least one path-holding roll preventing a collision of said printing substrate (2) with the return side (7", 8") of said belts (7, 8).

* * * * *